I. FERTMAN.
PORTABLE ELECTRIC BATTERY.
APPLICATION FILED DEC. 16, 1915.
1,213,175.
Patented Jan. 23, 1917.
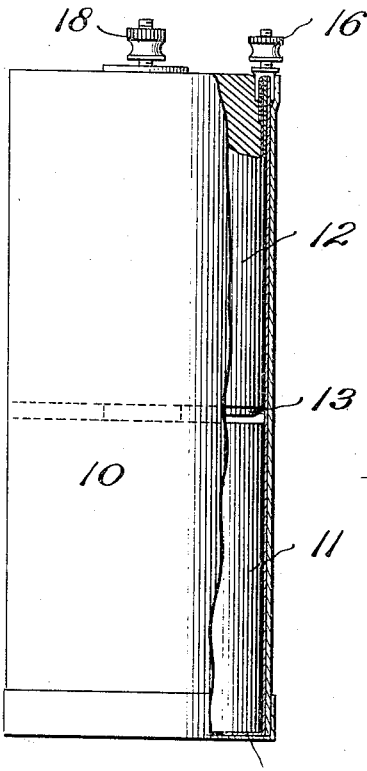
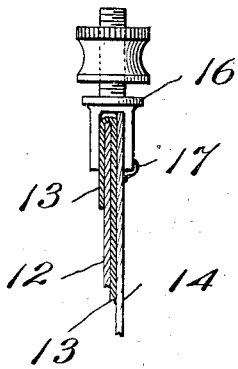
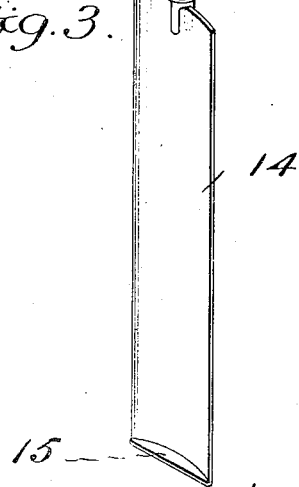
Isidor Fertman
Inventor
By his Attorneys
Wilkinson, Guista and Mackay

UNITED STATES PATENT OFFICE.

ISIDOR FERTMAN, OF NEW YORK, N. Y.

PORTABLE ELECTRIC BATTERY.

1,213,175. Specification of Letters Patent. Patented Jan. 23, 1917.

Application filed December 16, 1915. Serial No. 67,278.

*To all whom it may concern:*

Be it known that I, ISIDOR FERTMAN, a citizen of the United States, residing at No. 430 West Fourteenth street, in the city of New York and State of New York, have invented certain new and useful Improvements in Portable Electric Batteries; and I do hereby declare the following to be a full, clear, and exact description of the invention, such as will enable others skilled in the art to which it appertains to make and use the same.

The present invention has reference to means whereby two or more cells may be combined in a convenient portable form for ready use, in such a manner as to connect the same automatically and instantaneously in series; and the invention will be found especially useful in connection with the manufacture of what are known as "dry cells" used for gas engine work, portable lamps, telephones and for many other well known purposes.

The principal advantage of the invention is that it makes it possible to produce a low resistance series connection between the cells with the utmost expedition, and without recourse to soldering or spring connections. This makes it possible to replace a damaged cell in a group without expert knowledge and without tools.

Another, and incidental advantage, is that single cells may be stored separately and may be assembled in such groups as are desirable when wanted. One result of this is that, where any accident happens to a single cell, or when it is found that, for some reason, not externally visible, a single cell is deficient, it may be discarded by itself, without destroying any permanent connection with another cell or cells.

While I have herein shown and described the invention as applied to a group of two cells in series, it will be readily understood that a greater number may be connected in accordance with the same principle.

In the accompanying drawing Figure 1 is a side elevation of a two cell group with some portions broken away to exhibit certain details, Fig. 2 is an enlarged sectional view of the preferred arrangement of the peripheral binding post, and Fig. 3 is a perspective view of my improved removable conducting plate.

My improved combination comprises two or more superposed battery cells of that type wherein the external wall (usually of zinc) constitutes one electrode, of which cells the lowermost is bare and the others bear suitably placed insulation (such as varnish or paper). These are combined with a wide conducting strip so curved as to conform to the curve of the cells and bearing at its upper end a binding post adapted to be supported on the edge of the uppermost cell, being insulated from the zinc of all the cells but the lowermost, with which it is held in close contact by a suitable container (preferably of cardboard or the like) in which the group is placed and within which it fits with a suitable degree of tightness.

In the drawings the outer cylinder of cardboard is shown at 10, and the lowermost bare dry cell at 11. The upper cells are represented by the single cell 12, preferably entirely enveloped in paper 13, which serves as insulation and preferably turned inward under the edge of the cell as shown at 13 in Fig. 1. The upper edge of this paper is turned over the top edge of the zinc peripheral wall of each of the covered cells, as clearly shown in Fig. 2.

In order to provide a ready means of connection with one extremity of the battery, represented by the lowermost zinc wall, I provide a conducting plate 14, so curved in cross section as to fit the outside of the cells, and preferably provided with a retaining ledge 15 which serves to insure firm and permanent connection between successive cells, by preventing their slipping apart.

The top of the plate 14 is provided with a binding post 16 preferably applied thereto in the manner shown, that is to say by having a notch cut into the under part which straddles the plate 14, one side of said notched portion being soldered to the plate 14 as shown at 17. The notch under the binding post is sufficiently wide so that it can be forced over the top edge of the zinc 12 and the turned over paper or other insulation 13, as clearly shown in Fig. 2. The length of the plate 14 is such that, when the binding post 16 is forced into the position shown in Fig. 2, the ledge 15 is turned under the lowermost cell of the group as shown at 15 in Fig. 1.

As shown in dotted lines in Fig. 1, each cell has the usual projecting carbon electrode at its center, which is held in firm contact with the bottom of the next zinc cup above it. The topmost electrode is provided with the binding post 18.

The parts having been thus assembled, they are pressed into the tightly fitting outer insulating casing 10, whereby firm connecting contact is preserved between the plate 14 and the lowermost cell, and the various parts are held substantially immovable. It will be seen that I produce in this manner a battery of convenient portable form, which can be connected with any external electrical device by means of the binding posts 16 and 18.

What I claim is:—

1. A portable battery comprising in combination a group of superposed cells the lowermost of which is bare while the others carry a suitable external insulation, a removable conducting plate having a binding post at one end and fitting closely against all of said cells, and an external insulating casing snugly fitting said cells and plate.

2. A portable battery comprising in combination a group of superposed cells the lowermost of which is bare while the others carry a suitable external insulation, a removable conducting plate curved to fit said cells and extending along the same, a slotted binding post fixed to one end of said plate and straddling the edge of the uppermost cell, and an external insulating casing snugly fitting said cells and plate.

3. A portable battery comprising in combination a group of superposed cells the lowermost of which is bare while the others carry a suitable external insulation, a removable conducting plate curved to fit said cells, extending along the same and having a retaining ledge extending under the edge of the lowermost cell, a binding post at the top of said plate adapted so to engage the edge of the top cell as to confine the cells between it and said ledge, and an external insulating casing snugly fitting said cells and plate.

4. As an article of manufacture a removable connecting element for batteries comprising a cylindrically curved plate having an internal ledge at one end and a binding post at the other end provided with a slot adapted to straddle the edge of a battery cell of the general type described.

In testimony whereof, I have affixed my signature.

ISIDOR FERTMAN.